May 3, 1949.         H. A. KOPP              2,468,828
                HYDRAULIC DRIVE FOR MOTOR VEHICLES
Filed Dec. 12, 1946                          2 Sheets-Sheet 1
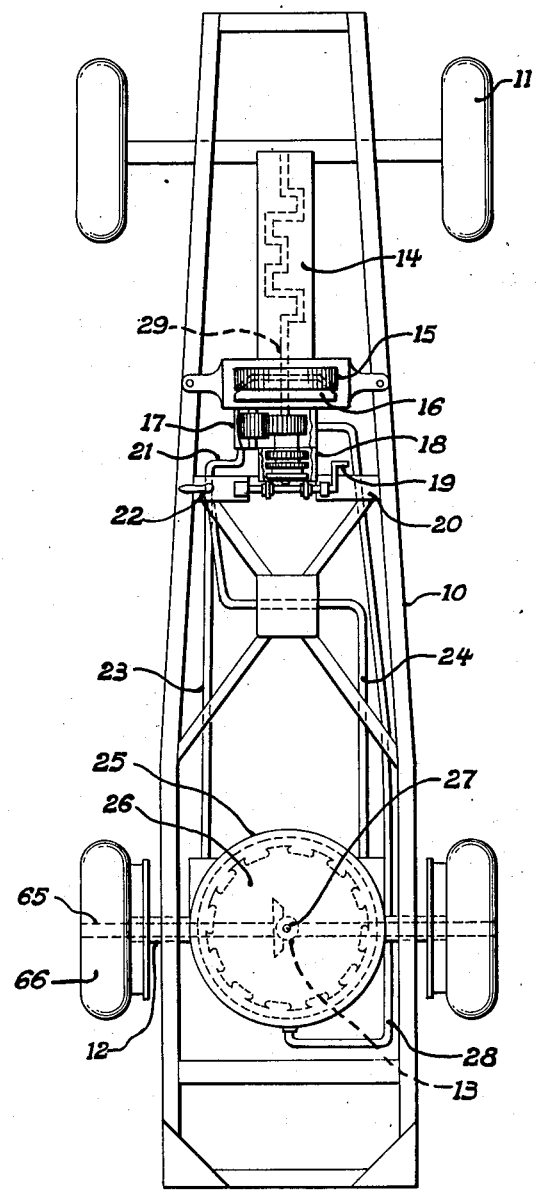
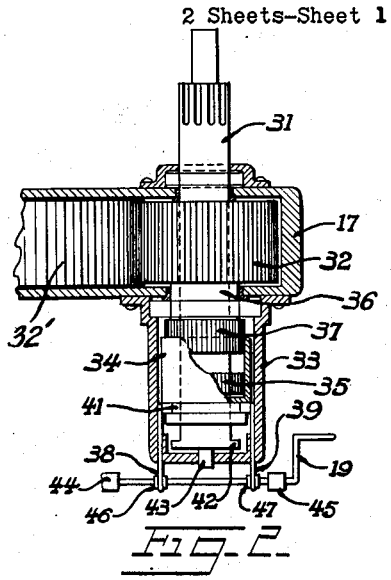
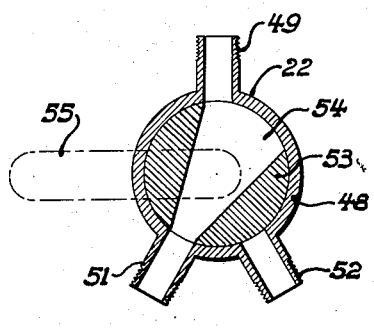
INVENTOR
HERMAN A. KOPP
BY
*ATTORNEY*

May 3, 1949. H. A. KOPP 2,468,828
HYDRAULIC DRIVE FOR MOTOR VEHICLES

Filed Dec. 12, 1946 2 Sheets-Sheet 2

INVENTOR
HERMAN A. KOPP
BY
ATTORNEY

Patented May 3, 1949

2,468,828

UNITED STATES PATENT OFFICE 2,468,828

HYDRAULIC DRIVE FOR MOTOR VEHICLES

Herman A. Kopp, Bronx, N. Y.

Application December 12, 1946, Serial No. 715,806

3 Claims. (Cl. 180—66)

1

This invention relates to hydraulic arrangements for operating motor vehicles.

It is the object of the invention to provide an automotive propelling arrangement in which the usual transmission may be dispensed with and wherein there is no need for the use of clutch mechanisms to change speed gears when this arrangement is put to ordinary use.

It is another object of the invention to provide a propelling arrangement for motor vehicles which will give a smooth drive, and which requires stepping upon the accelerator instead of the usual shifting of gears to bring the vehicle up to required speed.

It is another object of the invention to provide a hydraulic mechanism for motor vehicles which is simple to construct, efficient in operation, and can be produced at low cost.

According to the invention, the usual engine power plant is connected through a clutch to a gear pump. Associated with this gear pump is a slide clutching gear operated by manual mechanism within the driver's compartment and serving to connect and disconnect the gear pump. One of the pump gears is transversely of the main drive shaft and the slide gear is carried by the drive shaft and adapted to be adjusted to lock the drive shaft with the pump drive gear. Also accessible to the operator is a two way valve controlling the output flow of oil from the pump and serving to direct the same to one side of a driving motor carried on the rear of the motor vehicle above the differential and adapted through a pinion gear on the driving motor extending vertically downwardly to drive the differential. As the valve is turned to a second position, the fluid will be directed to the opposite side of the blades of the driving motor to rotate the rotor thereof in the reverse direction whereby to reverse the direction of the motor vehicle or utilize the same for braking on hills.

The driving motor, extending in pancake fashion over top of the rear axle and the differential, is of sufficient diameter to enable it to be rotated without too high a pressure being developed in the feed lines. The operator need only to accelerate the engine and at times when a stop is desired, such as when the ordinary foot brake is used, the reversal of flow of the fluid may be had upon the blades of the driving rotor. Only in cases of emergency would braking other than by the hydraulic arrangement be necessary. At that time the ordinary foot brakes would be used.

For further comprehension of the invention, and of the objects and advantages thereof, reference will be had to the following description

2 and accompanying drawings, and to the appended claims in which the various novel features of the invention are more particularly set forth.

In the accompanying drawings forming a material part of this disclosure:

Fig. 1 is a top plan view of a vehicle chassis bearing the hydraulic arrangement of the present invention.

Fig. 2 is an enlarged cross sectional view of a portion of the gear pump and of the sliding gear arrangement for connecting and disconnecting the main drive shaft which extends through the pump driving gear with the pump gear whereby to operate the pump or disconnect the same, hand mechanism being supplied to operate the sliding gear element.

Fig. 3 is an enlarged cross sectional view of the two way control valve which is used for controlling the flow of fluid to the driving motor.

Figure 4:
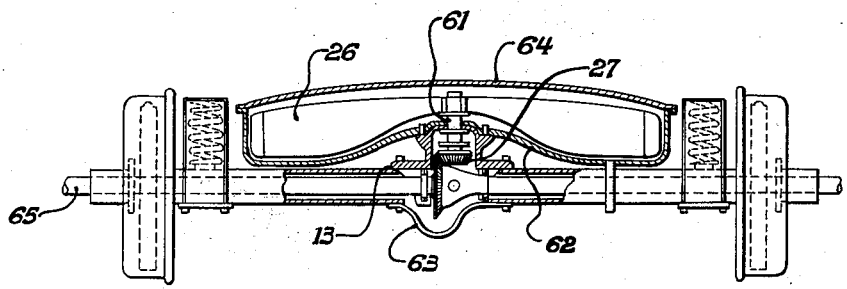
Fig. 4 is a vertical cross sectional view taken through the driving motor and the differential mechanism with which the driving motor is geared.

Referring now particularly to Fig. 1, 10 represents a vehicle chassis having front wheels 11 and a rear axle structure 12 including a differential 13. At the forward part of the chassis is a vehicle power plant 14 and a fly wheel 15 with the usual clutch 16 in engagement therewith. Carried on the clutch housing is a gear pump 17 and its connecting gear mechanism 18 operable by a manual operating lever 19 carried on inwardly extending frame pieces of the chassis. At the rear of the pump is an outlet pipe 21 directing fluid under pressure to a two way valve 22 from which there extends two pipes 23 and 24 extending rearwardly for entrance to opposite sides of a driving motor 25 having an internal two way operable rotor 26. This rotor 26 is connected by a pinion 27 with the differential 13. A return pipe 28 extends from the rotor to the pump 17 to return the used fluid to the pump 17. The pump 17 may have a reservoir embodied in it and may also have a by-pass mechanism for returning oil to the pump reservoir in case of stoppage or shut off of the fluid lines.

As the two way valve 22 is operated fluid will be directed to either of the lines 23 and 24 to change or direct the fluid to opposite sides of the motor 25 to cause the rotation of the differential gear 13 in one direction or the other whereby to change the direction of movement of the vehicle.

The power plant 14 has a crank shaft 29 which is connected to the fly wheel 15. The clutch 16 will normally engage the fly wheel 15 but may be disengaged at times when it is desired that the gear pump be "shifted" into operative position. A disengagement of the clutch 16 by the usual foot mechanism (not shown) of the vehicle will permit the operation of the sliding gear mechanism 18 carried on a shaft 31 which is splined to the clutch 16. The shaft 31 extends through a driving pump gear 32 which meshes with gear 32' of the pump 17 (Fig. 2). The shaft 31 extends rearwardly of the pump housing and into a connecting gear housing 33. On the rear end of the shaft 31, there is slidably connected an internal gear 34 movable between two positions by the manually operable lever 19. The shaft 31 has gear teeth 35 meshing with the internal gear 34. The pump gear 32 has an extension 36 with gear teeth 37 thereon. The internal gear 34 upon being slid forwardly meshes with the gear teeth 37 so that the pump gears thereupon become locked with the driving shaft 31. Members 38 and 39 are operated by the crank 19 and lodge in annular recess 41. As the gear 34 is pulled rearwardly, it is prevented from leaving the shaft 31 by a shoulder portion 42 at the end thereof. The shaft 31 has a pilot 43 extending through the rear wall of the casing. The crank 19 is pivoted to shelving pieces 20 and have upstanding arms 46 and 47 which connect at their upper ends with the slide members 38 and 39 respectively. As the internal gear 34 is brought rearwardly, the pump 17 will be disconnected from the engine drive and as it is moved forwardly, connection is made of the engine drive with the pump.

Referring now to Fig. 3, the valve 22 comprises a casing 48 with an inlet nipple 49 and two outlet nipples 51 and 52 spaced from one another at approximately 60 degrees. Within the casing 48 is a rotatable valve plug 53 having a flared transverse opening 54 extending diametrically thereacross from one side to the other. The flare is such that no matter which position the plug 53 is rotated to, it will always receive fluid from the inlet nipple 49. To operate the valve plug there is provided a handle 55. If the plug is rotated to deliver fluid to nipple 51, the fluid will pass through pipe line 23 to the driving motor 25.

Figure 5:
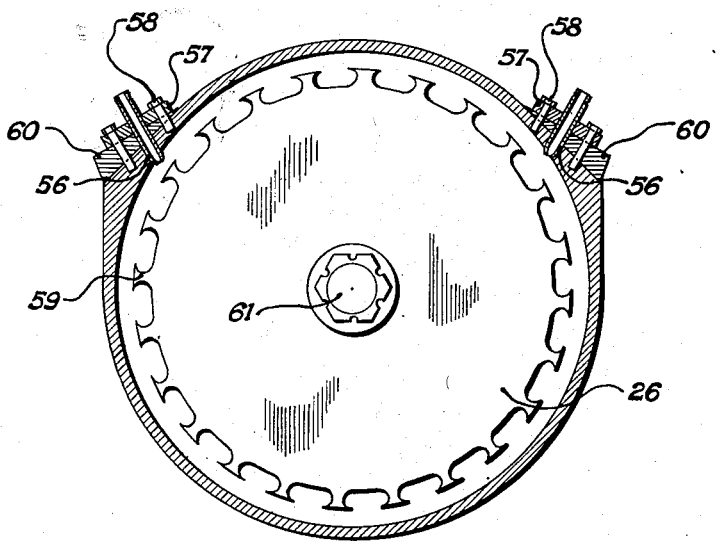
Fig. 5 is a plan view of the hydraulic motor with the cover of the driving motor removed and looking directly upon the driving rotor and the blades thereof.

Referring to Fig. 5, a nozzle 56 extends through the motor casing and is connected thereto by a clamping plate 57 and bolts 58. In order to alter the position of the nozzle so that the stream therefrom will strike rotor blades 59 at a different angle, shims 60 of different taper can be placed under the clamping plate 57. The blades 59 are of such construction as to receive the fluid stream and the work derived therefrom will cause the rotation of the rotor 26. Secured to the center of the motor is a shaft 61 journalled in the bottom of the rotor casing 62. This casing 62 is recessed on the bottom to accommodate the differential gear housing 63. The rotor consequently, in order that the driving motor will not consume too much vertical space above the rear axle, is likewise recessed in its bottom center region to allow the outer periphery of the rotor to lie near the bottom of the casing 62. On the top of the casing 62 is a cover 64.

Shaft 61 carries the pinion 27 and drives the differential gear 13. As the differential 13 is driven rear axle shaft 65 will drive the rear wheels 66, whereby to move the vehicle in one direction.

If the valve plug 53 is turned so its opening 54 registers with the nipple 52, fluid will be delivered through the pipe line 24 and a stream will be directed upon the blades 59 from an opposite angle. Accordingly the rotor 26 will be driven in the opposite direction and the vehicle will be given a reverse motion. The pipe line 24 is likewise connected by clamping plate means to the motor casing 62 and by a similar shim 60 the angle of approach of the fluid stream may be altered.

It should now be apparent that there has been provided a simple, efficient and effective hydraulic mechanism for propelling a motor vehicle. By merely regulating the valve to select the direction of movement for the vehicle and stepping on the engine accelerator, the vehicle will move forward smoothly without the need for shifting gears. If good braking is desired for the vehicle, the valve plug can be instantly changed to direct the flow of fluid to the opposite side of the driving motor. If the vehicle is to be stopped, the usual clutch may be temporarily disengaged until such time that the slide gear of the pump can be disconnected.

It is to be understood that the engine could be mounted in the rear portion of the vehicle preferably crosswise as the only connection between it and the driving motor is the hydraulic tubes.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In combination, a vehicle comprising a differential driving mechanism, an engine power plant and a main friction clutch, a drive shaft extending from the clutch, a pump for building up hydraulic pressure, a second gear-toothed type clutch device adapted to connect and disconnect the pump with the drive shaft, manually operable means accessible to the operator for effecting the operation of the latter clutch device, a driving motor connected to the differential driving mechanism, selector means connected between the pump and the driving motor to change the flow of fluid to the driving motor to operate the same in one direction or the other.

2. In combination, a vehicle comprising a differential driving mechanism, an engine power plant and a main friction clutch, a drive shaft extending from the clutch, a pump for building up hydraulic pressure, a second gear-toothed type clutch device adapted to connect and disconnect the pump with the drive shaft, manually operable means accessible to the operator for effecting the operation of the latter clutch device, a driving motor connected to the differential driving mechanism, selector means connected between the pump and the driving motor to change the flow of fluid to the driving motor to operate the same in one direction or the other, said pump being of the gear type and having a driving pump gear, said shaft extending axially through the pump gear for rotation independently thereof, said second clutch device including a gear on said shaft, said pump gear having an extension concentric with the shaft and with gear teeth thereon, and a sliding gear with internal teeth adapted to be operated by said manually operable means to make connection between the gear on the shaft and the gear teeth on the pump gear extension to establish a driving connection therebetween and at the same time provide means by which the pump can be disconnected from the shaft.

3. An automobile comprising an engine, a flywheel driven thereby, a main transmission shaft, a friction clutch normally holding said main shaft to said flywheel whereby said main shaft can be temporarily disengaged from said flywheel by the opening of said friction clutch, a gear pump having a pump gear rotatably mounted on said main shaft for rotation of said main shaft relative thereto, and having a pump gear meshing with said first mentioned pump gear, a neck integral with said first mentioned pump gear, a splined collar integral with said neck, a splined collar integral with said main shaft, a sliding splined sleeve on said main shaft splined collar, means for sliding said sleeve onto said neck splined collar to unite said splined collars, said sleeve being slid when said friction clutch is open, a differential drive, a reversible fluid motor for driving said differential drive, an outlet line from said pump, a two way valve in said outlet line, two pipes leading from said two way valve to opposite sides of said fluid motor for driving same in opposite directions depending upon the position of said two way valve, and a return line from said fluid motor to said pump.

HERMAN A. KOPP.

REFERENCES CITED

The following references are of record in the file of this patent:

UNITED STATES PATENTS

| Number | Name | Date |
|---|---|---|
| 976,226 | Stevenson | Nov. 22, 1910 |
| 1,138,667 | Kitchen | May 11, 1915 |
| 1,347,279 | Kraus | July 20, 1920 |

FOREIGN PATENTS

| Number | Country | Date |
|---|---|---|
| 812,475 | France | Feb. 1, 1937 |